E. W. HENNING.
CLOTH MEASURING MACHINE.
APPLICATION FILED MAY 9, 1914.
1,158,686.
Patented Nov. 2, 1915.
3 SHEETS—SHEET 3.
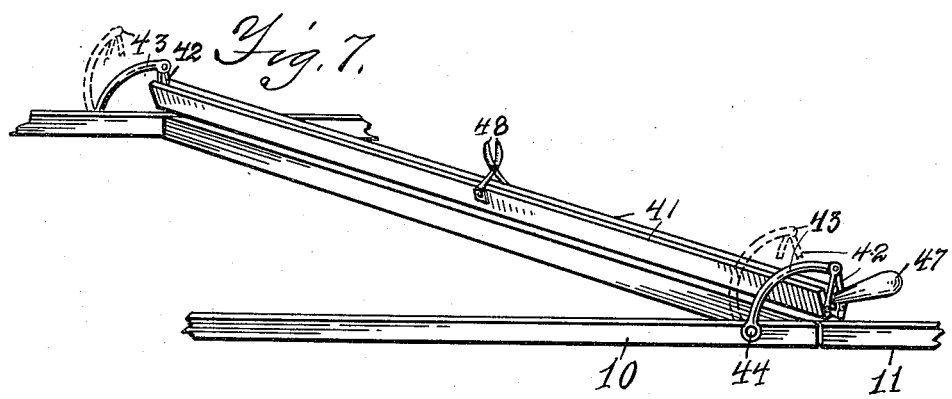
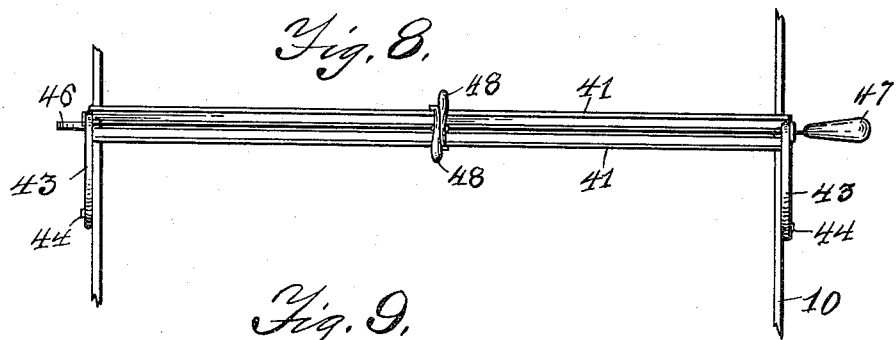
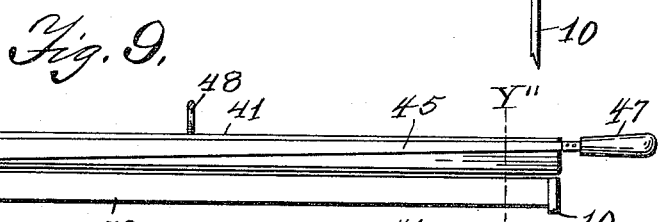
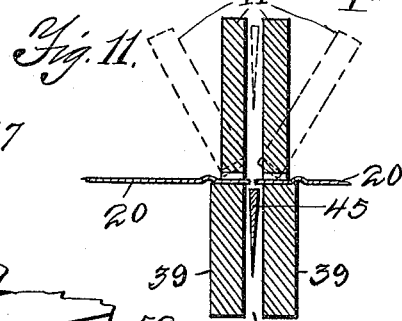
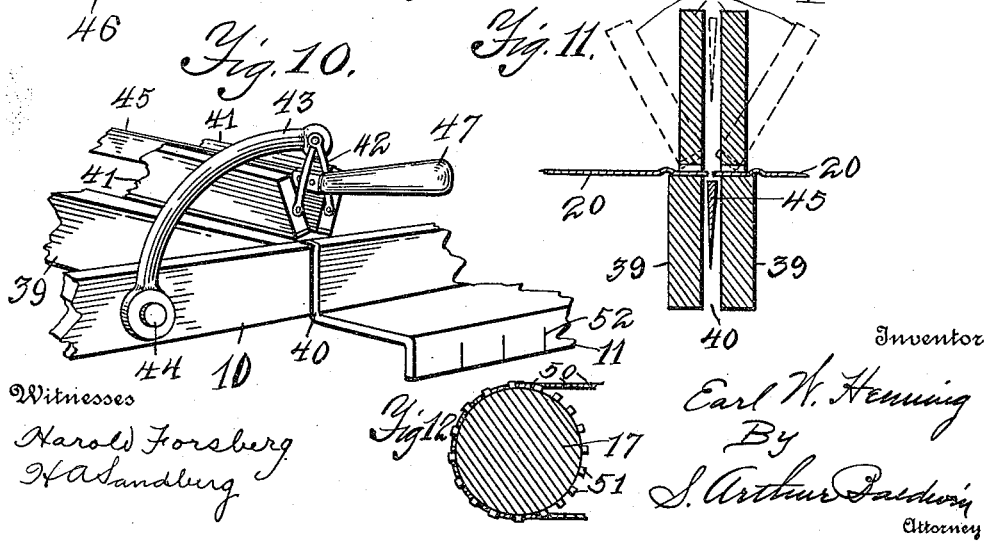
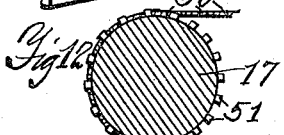

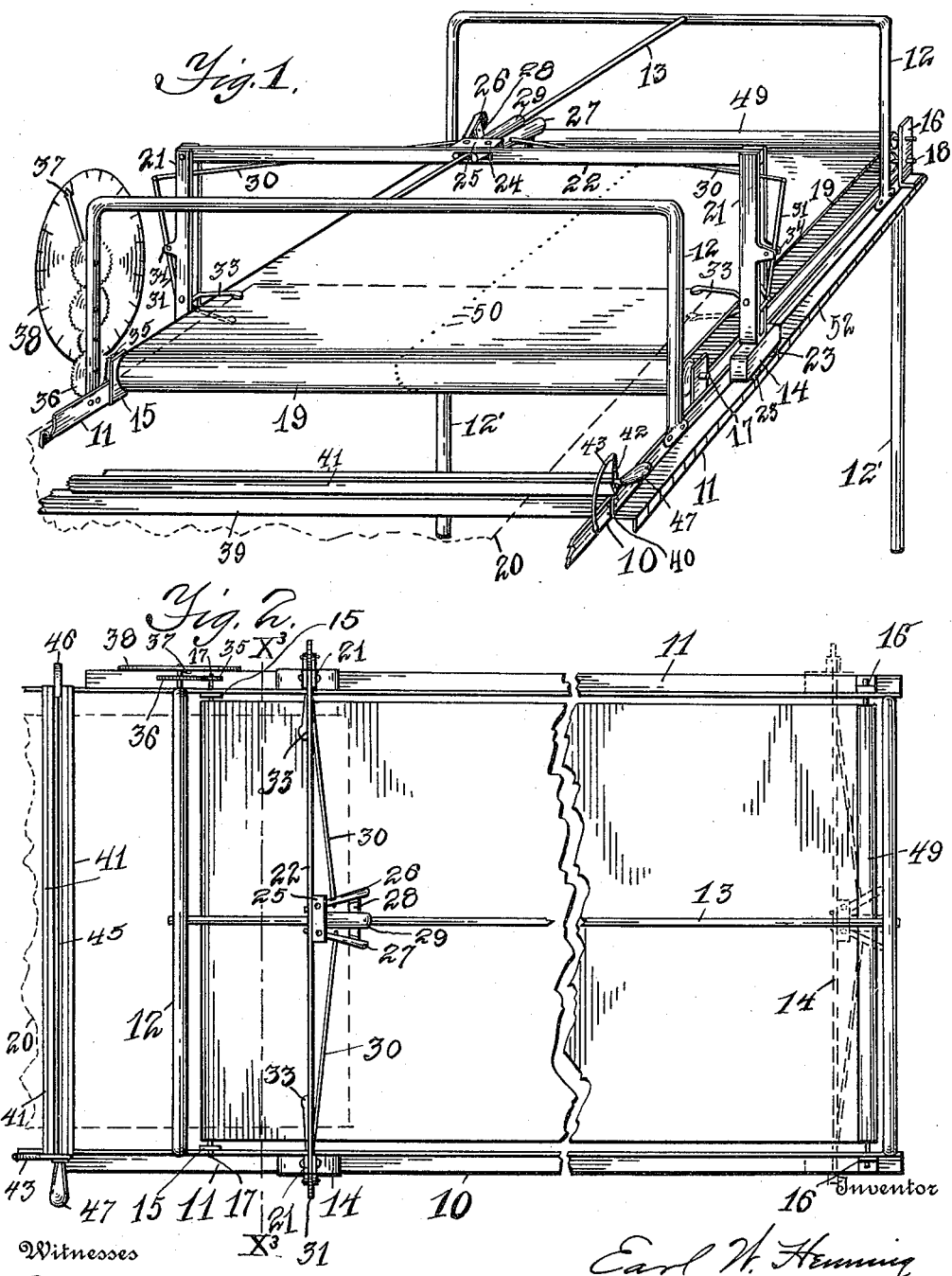

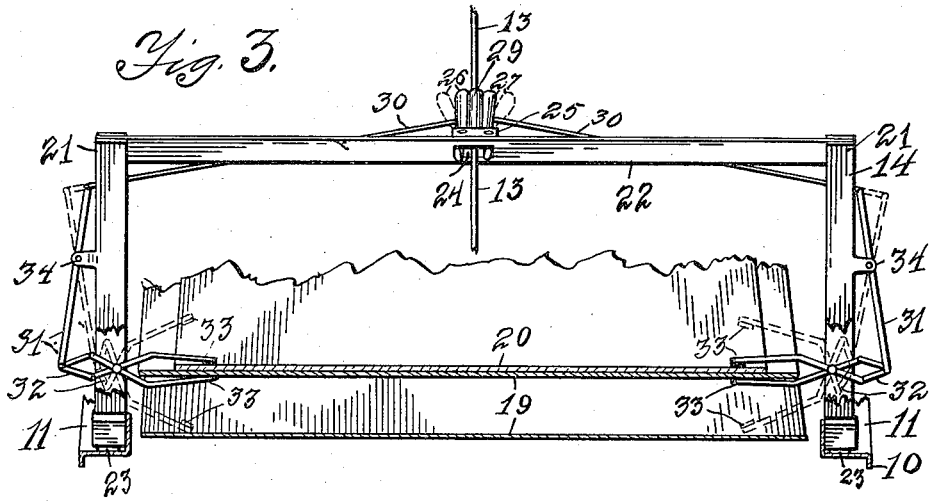
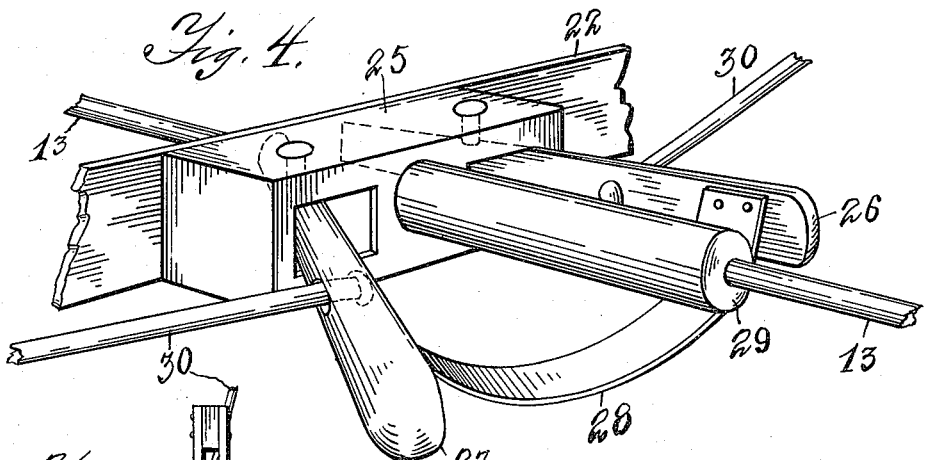
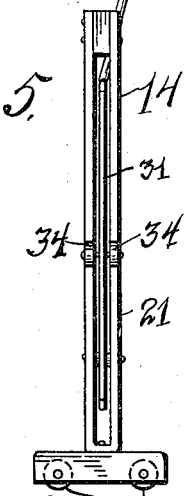
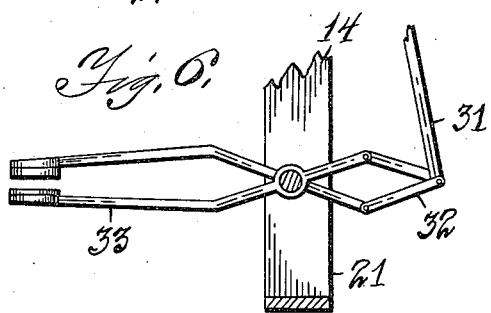

UNITED STATES PATENT OFFICE.

EARL W. HENNING, OF JAMESTOWN, NEW YORK.

CLOTH-MEASURING MACHINE.

1,158,686.  Specification of Letters Patent.  Patented Nov. 2, 1915.

Application filed May 9, 1914. Serial No. 837,405.

*To all whom it may concern:*

Be it known that I, EARL W. HENNING, a citizen of the United States, residing at the city of Jamestown, in the county of Chautauqua and State of New York, have invented certain new and useful Improvements in Cloth-Measuring Machines, of which the following, taken in connection with the accompanying drawings, is a specification.

The invention relates to devices for measuring cloth or other flexible material in quantity; and the object of the improvement is to provide, first, a simple and accurate mechanism whereby the cloth or other flexible material may be quickly and accurately measured into comparatively short lengths from the bolt or roll; and second, to provide means on said measuring mechanism for accurately cutting the cloth or flexible material; and third, to provide registering mechanism whereby the exact measurements may be indicated, and the invention consists in the novel features and combinations hereinafter set forth and claimed.

In the drawings, Figure 1 is a perspective view of the cloth measuring and cutting mechanism, showing the construction and arrangement of the different parts; and Fig. 2 is a plan view of the same. Fig. 3 is a crosswise sectional view of the cloth measuring machine at line $X^3$ $X^3$ in Fig. 2, showing an elevation of the toggle-clamps for engaging the cloth in measuring the same; and Fig. 4 is a perspective view of the clamp which controls the toggle-clamps for each edge of the material to be measured; and Fig. 5 is an end elevation of the upright supporting frame for the toggle-clamp mechanism; and Fig. 6 is an elevation of one of the toggle-clamps with a portion of one of the supporting standards for the same. Fig. 7 is a perspective view of the knife or cutting mechanism; and Fig. 8 is a plan view of the same; and Fig. 9 is an elevation of the knife and clamping bar with the handle of said bar in section, showing the construction and arrangement of the cutting knife; and Fig. 10 is an enlarged perspective view of the handle end of the knife; and Fig. 11 is a crosswise sectional view of the knife mechanism and clamps at line Y—Y in Fig. 9, showing the cloth immediately after the cut has been made. Fig. 12 is a crosswise sectional view of one of the rolls, showing the pin and hole alinement of the flexible band or web on said rolls much after the manner of a sprocket wheel and chain.

Like numerals of reference refer to corresponding parts in the several views.

The numeral 10 designates the supporting frame, which is composed of two angle iron side tracks 11 connected by two upwardly bent or raised cross or connecting rods 12, and has leg supports 12', which leg supports may be foldable without departing from the invention.

The uprights or raised cross bars 12 are connected midway of their length by a rod 13 which forms a guide for the traveling or clamping frame 14. The angular side tracks 11 have lugs 15 and 16 attached thereto to revolubly support rollers 17 and 18 thereon. An endless flexible belt band or web 19 is mounted on rollers 17 and 18 in the form of a belt to be manually operated and receive thereon the cloth or other material 20 to be measured and thereby form a traveling table or support for the cloth.

The traveling frame 14 consists of the double uprights 21 and the top connecting cross bar 22, which is supported at each side upon rollers 23 to travel backward and forward freely on the tracks 11.

The top bar 22 of the frame 14 has an opening or slot 24 lengthwise therein to receive therethrough the guide rod 13. A block or box 25 is attached to one side of the bar 22 around the slot 24 and has pivotally mounted therein the handles or levers 26 and 27. The levers 26 and 27 do not clamp the rod 13 but are attached midway of their length to the ends of the rods 30; they are normally pressed apart by a spring 28 which preferably bends downward and passes beneath the rod 13 a sufficient distance from said rod to give plenty of room for the fingers of the operator in controlling the levers or handles 26 and 27 and moving the frame 14.

A guide and bumper 29 extends out from the block 25 a sufficient distance to strike against the rear upright 12 before the levers 26 and 27 to thereby stop the traveling frame 14 at the exact point desired in order to give the correct measurement and keep the traveling frame 14 in line preventing its binding on the guide rod 13. As stated, each of the handles 26 and 27 is connected to one end of a rod 30. The other end of each of the rods 30 is pivotally attached to the links 31, which links are pivotally supported on projecting lugs 34 on the uprights 21 about midway of the length of the links 31. The lower ends of the links 31 are pivotally connected to the toggles 32 which in turn are connected to the pivoted clamping jaws 33, one jaw extending below the web 19, and the other jaw above said traveling web.

It is now apparent that when the levers 26 and 27 are pressed outward by the spring 28 the jaws of the clamps 33 will stand normally apart and by means manually pressing said levers 26 and 27 toward one another the toggles 32 will be drawn outward, thereby closing the jaws 33 upon the cloth 20 and traveling web 19, and while in this closed position the frame 14 may be manually moved to any desired point between the two uprights 12 on the rod 13, and that as soon as the levers 26 and 27 are released the clamping jaws 33 will release their hold upon the cloth 20 and web 19 so that the frame 14 may be freely moved back to the starting point without disturbing the cloth. The frame 14 and web 19 are easily moved back and forth by the hands of the operator on the levers 26 and 27. Of course the web 19 is not moved except when clamped at each side by the clamping jaws 33.

The movement of the web 19 in measuring the cloth or flexible material 20 turns the rollers 17 and 18 by the frictional pull of the belt or web. A gear 35 is attached on one end of the roller 17 and meshes in a gear 36, which in turn meshes in other intermeshing gears to thereby operate a revolving dial 38 alongside of a stationary indicator or guide pointer 37 which indicates or registers the measurement in any desired system of registering upon the revolving dial 38. The dial 38 and gearing are preferably supported on the upright of connecting rod 12 adjacent the end of the roller 17.

A cutter for the cloth or other flexible material is provided consisting of a pair of cross bars 39 one on each side of a division or cleft 40 in the frame 10. A pair of clamping bars 41 are provided, one each side of the cleft or division 40. The bars 41 are supported by links 42 which are pivotally attached to the inner edges of the ends of the bars 41 at one end of said links and to a supporting arm 43 at the other. Said supporting arm 43 is pivotally attached at 44 to side rail 11 so that the bars 41 may be raised or thrown back out of touch with the traveling cloth and belt. A knife 45 is supported at one end by a curved spring 46 which is attached to the under side of the cross bar 39 at one end and to the end of the knife 45 at the other, which arrangement permits of the downward movement of the knife from the free end by means of a handle 47. The edge of the knife 45 is formed at a gradual incline to give a shearing cut upon the cloth as it passes through the same.

In order to control the clamp bars 41, it is usually only sufficient to press downward thereon, thereby clamping the cloth, as shown in Fig. 11, each side of the cleft 40 and immediately over the cross pieces 39 of the frame. When the pressure is released, the attachment of the links 42 in toggle form to the inner edges of the bars 41 and slightly below their centers causes the bars 41 to spread on their upper edges. A pair of handles 48 Fig. 7 are pivotally attached to one another and to the clamping bars 41 on their opposite sides, so that by clasping the handles 48 the operator immediately turns the clamping bars 41 into the vertical position shown in Fig. 11, so that downward pressure can be placed upon the same as desired; this however is not usually necessary.

It is apparent that the point of beginning for the scale of measurement must invariably be at the cleft 40, and all that is necessary to measure flexible material is to have it suitably mounted on a revoluble shaft or in bolt form so that it can revolve, thereby permitting the cloth or flexible material 20 to be drawn from the roller and measured in the desired length. An additional roller 49 is provided above roller 18 upon which the cloth 20 may be rolled by means of a suitable handle or crank; it also aids in holding the cloth tight while the traveling frame passes back.

In order to keep the web 19 perfectly in line for the measuring mechanism, it is preferred that a line of spaced holes 50 should be provided through the middle of the web 19 and that the roller 17 should have a series of pins 51 to engage the holes 50, thereby keeping the web perfectly in line and uniform in movement preventing the slipping of the web and thereby insuring a positive measurement on the dial.

A suitable scale of measurement 52 may be provided along the side of the angular side bar 11 in any desired scale so as to measure the cloth or other flexible material, which scale should invariably start at the cleft 40. This is sometimes convenient for short measurements like fractions of a yard, though the dial 38 and pointer 37 are usually relied upon for such measurements.

In measuring cloth the operator inserts the end of the cloth between the clamping jaws 33 and grasps the handles or levers 26 and 27 pressing them toward one another thereby closing the clamping jaws 33 upon the end of the cloth 20 and the web or belt 19. The hand which manually controls the levers 26 and 27 then draws the frame 14 toward the raised cross bar 12 at the opposite end thereby measuring that amount of cloth. The belt 19 forms an easily movable support for the cloth 20 and is preferred though it is apparent that the movable frame 14 and raised cross bars 12 with connective guide rod 13 might be erected upon a common table top and would serve a good purpose though not as convenient and easily operable a measuring device as with the movable supporting belt 19. As soon as the raised cross bar 12 is reached by the bumper 29 the handles or levers 26 and 27 are released thereby releasing the cloth 20 and web 19, and the frame 14 may then be moved back to the desired starting point on the scale without compressing the levers 26 and 27 and closing the clamping jaws 33. When the desired point is reached the jaws 33 are again closed by pressure of the levers 26 and 27 and the measuring process is repeated. The belt 19 turns the roller 17, thereby operating the gearing 36 and the pointer 37 on the registering dial 38, thereby indicating the amount of cloth measured.

I claim as new:

1. A measuring machine comprising a frame, rollers revolubly mounted on said frame, a flexible traveling belt or web mounted on said rollers for supporting the material to be measured, a manually operable clamp for clamping said belt and the material to be measured and moving the same in unison, a spaced distance, and means on said frame in connection with said belt or web for measuring said material.

2. A measuring machine comprising a frame, said frame consisting of side pieces connected by suitable cross bars and supports for said side pieces, spaced rollers on said side pieces, a belt on said rollers to form a traveling table for the material to be measured, tracks on said side pieces, a traveling frame movably mounted on said tracks, and means on said traveling frame for engaging said belt and the material to be measured to synchronously move said belt and material a spaced distance.

3. In a measuring machine, a frame consisting of angular side pieces to form tracks at each side, spaced rollers on said side pieces, spaced raised connecting bars connecting said side pieces, a guide rod connecting said spaced raised connecting bars, a traveling frame movably mounted on said tracks and slidably engaging said guide rods to hold said frame in line, means on said traveling frame for engaging the material to be measured and said guide rod, and a belt on said roller for supporting said material to be measured.

4. In a measuring machine, a frame consisting of angular side pieces to form tracks at each side, spaced rollers on said side pieces, raised connecting bars connecting said side pieces, a guide rod connecting said raised connecting bars, a traveling frame movably mounted on said tracks and slidably engaging said guide rod, a movable belt on said rollers for supporting the material to be measured, clamps on said traveling frame for engaging said movable belt and the material to be measured, and means on said traveling frame for operating said clamps.

5. In a measuring machine, a frame consisting of angular side pieces to form tracks thereon at the opposite sides, raised connecting bars connecting said side pieces, a guide rod connecting said raised connecting bars, a traveling frame movably mounted on said tracks and slidably engaging said guide rods, rollers revolubly mounted on said angular side bars at each end, a web belting on said rollers to movably support the material to be measured, clamps on said traveling frame engaging said web and the material to be measured, and means on said traveling frame for manually operating said clamps and moving said material and web.

6. In a measuring machine, a frame consisting of angular side pieces to form tracks thereon at the opposite sides, raised connecting bars connecting said side pieces, a guide rod connecting said raised connecting bars, a traveling frame movably mounted on said tracks and slidably engaging said guide rod, rollers revolubly mounted on said angular side bars at each end, a web belting on said rollers to movably support the material to be measured, clamps on said traveling frame engaging said web and the material to be measured, levers on said traveling frame, and link connection with said levers and said clamps to operate said clamps.

7. In a measuring machine, a frame consisting of angular side pieces to form tracks thereon at the opposite sides, raised connecting bars connecting said side pieces, a guide rod connecting said raised connecting bars, a traveling frame movably mounted on said tracks and slidably engaging said guide rod, rollers revolubly mounted on said angular side bars at each end, a web belting on said rollers to support the material to be measured, clamps pivotally mounted on said traveling frame each side of said web and the material to be measured to engage the same, levers pivotally mounted on said traveling frame, toggles on the ends of said clamps, link connection between said levers and said toggles to operate said clamps, and levers on said traveling frame each side of said guide rod to manually control said clamps and move said frame.

8. In a measuring machine, a frame consisting of angular side pieces to form tracks thereon at the opposite sides, raised connecting bars connecting said side pieces, a guide rod connecting said raised connecting bars, a traveling frame movably mounted on said tracks and slidably engaging said guide rod, rollers revolubly mounted on said angular side bars at each end, a web belting on said rollers to support the material to be measured, clamps pivotally mounted on said traveling frame to each side of said web and the material to be measured to engage the same from the upper and under sides, levers pivotally mounted on the cross bar of said traveling frame one each side of said guide rod, a spring to press said levers normally apart, toggles on said clamps, and links pivotally attached on said traveling frame and to said toggles at one end and to a link connection with said levers at the other end to thereby close said clamps by pressing said levers toward one another and to open said clamps by the action of said spring.

9. In a measuring machine for cloth and similar materials, a frame, means on said frame for supporting said cloth or other material and measuring the same, spaced cross bars on said frame having a cleft therebetween, spreading clamping bars pivotally supported over said cross bars on said frame and each side of said cleft to be manually pressed on to said cloth or other material each side of said cleft to stretch and hold the same for cutting, a knife extending the length of said cleft to pass down into the same and cut the stretched cloth or other material, a spring attaching one end of said knife to said frame, and a handle on the other end of said knife for operating the same.

10. In a measuring machine, a frame, rollers revolubly mounted on said frame, a belt on said rollers for supporting the material to be measured, means for clamping said material to be measured to said belt to move the same in unison, thereby revolving said rollers, gearing on said frame and meshing in a gear attached to the end of one of said rollers, a pointer attached to said gearing on said frame, and a registering dial for said pointer to register the measurement.

In testimony whereof I have affixed my signature in the presence of two witnesses.

EARL W. HENNING.

Witnesses:
H. A. SANDBERG,
HAROLD FORSBERG.

Copies of this patent may be obtained for five cents each, by addressing the "Commissioner of Patents, Washington, D. C."